(12) United States Patent
Wylie

(10) Patent No.: US 7,036,337 B2
(45) Date of Patent: May 2, 2006

(54) RECOVERY OF HYDROGEN FROM REFINERY AND PETROCHEMICAL LIGHT ENDS STREAMS

(75) Inventor: Roger Wylie, Baytown, TX (US)

(73) Assignee: Wylie Companies, INC, Marble Falls, TX (US)

( * ) Notice: Subject to any disclaimer, the term of this patent is extended or adjusted under 35 U.S.C. 154(b) by 410 days.

(21) Appl. No.: 10/652,052

(22) Filed: Aug. 29, 2003

(65) Prior Publication Data

US 2005/0047995 A1    Mar. 3, 2005

(51) Int. Cl.
*F25J 3/00*    (2006.01)

(52) U.S. Cl. .............. 62/625; 62/632; 62/635; 62/932

(58) Field of Classification Search .......... 62/632, 62/635, 625, 932
See application file for complete search history.

(56) References Cited

U.S. PATENT DOCUMENTS

| | | | | |
|---|---|---|---|---|
| 2,887,850 A | * | 5/1959 | Adams | 62/625 |
| 3,197,970 A | * | 8/1965 | Nelson et al. | 62/625 |
| 3,616,600 A | * | 11/1971 | Kurata et al. | 95/166 |
| 3,813,889 A | * | 6/1974 | Allam et al. | 62/639 |
| 4,102,659 A | * | 7/1978 | Martin | 62/625 |
| 4,370,156 A | * | 1/1983 | Goddin, Jr. et al. | 62/625 |
| 4,888,035 A | * | 12/1989 | Bauer | 62/631 |
| 5,453,559 A | * | 9/1995 | Phillips et al. | 585/809 |
| 5,592,831 A | * | 1/1997 | Bauer et al. | 62/625 |
| 5,799,507 A | * | 9/1998 | Wilkinson et al. | 62/621 |
| 6,082,134 A | * | 7/2000 | McNeil et al. | 62/632 |
| 6,578,377 B1 | * | 6/2003 | Licht et al. | 62/620 |

* cited by examiner

Primary Examiner—William C. Doerrler
(74) Attorney, Agent, or Firm—Murray Nadler

(57) ABSTRACT

A process for recovering hydrogen from a stream comprised of hydrogen, non-condensable gases, and propane and lighter hydrocarbons, wherein the process comprises the steps of stripping hydrogen and non condensable gases out of the feed light ends stream with methane vapor, washing the stripped hydrogen stream with liquid methane to absorb the non condensable gases, and washing the hydrogen stream with a hydrocarbon lean oil such as liquid ethane to absorb methane, to produce the product hydrogen stream.

19 Claims, 1 Drawing Sheet

RECOVERY OF HYDROGEN FROM REFINERY AND PETROCHEMICAL LIGHT ENDS STREAMS

FIELD OF THE INVENTION

This invention relates to recovering hydrogen from light ends streams produced in petroleum refineries and petrochemical plants.

BACKGROUND OF THE INVENTION

Hydrogen is used in petroleum refineries to remove sulfur from fuel products and to saturate olefins and aromatics to make chemical products. Hydrogen is produced as a byproduct in petroleum refineries and petrochemical plants. Byproduct hydrogen collects in light ends streams containing light hydrocarbons and also non-condensable gases—including carbon monoxide, carbon dioxide, and nitrogen. The light ends streams are usually processed to recover propane, propylene and heavier hydrocarbons using conventional fractionation techniques at ambient temperatures, and then further processed to recover ethylene, ethane and hydrogen at cryogenic temperatures. Streams processed at low temperatures are usually dried to remove water and treated to remove corrosive compounds including hydrogen cyanide, hydrogen sulfide, and also carbon dioxide.

Demand for hydrogen in petroleum refineries is increasing because allowable sulfur levels in fuels are being reduced particularly for heavier fuels. Also, increasing desulfurization intensity generally requires purer hydrogen which is taxing current hydrogen recovery processes. In most refining and petrochemical sites recovered byproduct hydrogen is not adequate to meet demand. Refiners make up the hydrogen shortfall by manufacturing on purpose hydrogen via steam reforming methane, propane, and naphtha. Unfortunately, on purpose hydrogen costs about three times as much as recovered byproduct hydrogen and also releases carbon dioxide into the environment.

With current technology typically only about 50% of the byproduct hydrogen produced in light ends streams is recovered. Hydrogen not recovered ends up in fuel gas streams and is burned. A primary reason why hydrogen recovery rates are low with current technology is that hydrogen bearing light ends streams usually contain non-condensable gases—nitrogen and carbon monoxide—and these gases are difficult to separate from hydrogen with current technology.

Hydrogen bearing light ends streams produced in petroleum refineries and petrochemical plants include off gas streams from fluid catalytic crackers, cokers, crude oil fractionation, isomerization, desulfurization, hydrocrackers, and dealkylation.

There is a need for a new process that can be readily integrated into refineries and petrochemical plants that recovers hydrogen produced in light ends streams to high yield and purity. The process of the present invention answers this need: it recovers up to 97% of the hydrogen available in light ends streams, including streams containing non-condensable gases such as nitrogen and carbon monoxide and can produce product hydrogen at purities of 98 mole % or higher, at a cost one third of on purpose hydrogen.

SUMMARY OF THE INVENTION

The present invention is a process for recovering hydrogen from refinery and petrochemical light ends streams at high yield and purity. The feed to the process is comprised of hydrogen and one or more components from a list that includes propane and lighter hydrocarbons, nitrogen, and carbon monoxide. The process includes stripping the most of the hydrogen and non-condensable gases out of the feed stream with methane vapor, absorbing the non-condensable gases out of the hydrogen stream using a liquid methane stream, and absorbing methane out of the hydrogen stream using a lean oil stream such as liquid ethane.

The feed stream is fed to the top of the first of a series of two or more strippers where the hydrogen, nitrogen and carbon monoxide is stripped out of the feed stream as it flows down the strippers forming a stripper overhead vapor stream that issues from the downstream stripper, by counter current contact with methane vapor streams that are fed into the bottom of the strippers. The liquid bottoms methane stream from the strippers contains most of the ethylene and heavier hydrocarbons that came in with the feed.

The downstream stripper overhead gas stream is fed into a rectifier tower where residual traces of hydrocarbons are washed out of the hydrogen stream to produce a rectifier overhead stream that contains most of the hydrogen, nitrogen and carbon monoxide that came in with the process feed free of ethylene and heavier hydrocarbons.

The rectifier overhead stream is conveyed into a reboiled absorber where the hydrogen stream is counter currently contacted with a stream of very pure liquid wash methane that absorbs most of the nitrogen and carbon monoxide out of the hydrogen stream to produce a reboiled absorber overhead gas stream that contains most of the hydrogen that came in with the feed and that is free of nitrogen and carbon monoxide. The reboiled absorber liquid stream, comprised of methane and the nitrogen and carbon monoxide, is discarded into the fuel gas system at the site after serving as refrigerant.

The reboiled overhead gas stream is fed into a methane absorber where it is counter currently contacted with a hydrocarbon liquid lean oil steam that absorbs methane out of the reboiled overhead gas stream to produce a gas overhead stream that is 98 mole % hydrogen or higher that is the product stream from the process of this invention.

The process includes a demethanizer that receives the liquid bottoms streams from the strippers and produces a liquid bottoms stream that contains most of the ethylene and heavier hydrocarbons that come in with the feed; the bottoms stream is sent on for further fractionation to recover hydrocarbons. The demethanizer also produces the methane stripping gas for the strippers from its overhead vapor stream and the pure methane wash liquid stream for the reboiled absorber from a liquid reflux stream or side stream.

To produce a product stream of up to 90 mole % hydrogen purity the methane absorber and its lean oil system is not required.

If the feed stream does not contain nitrogen, carbon monoxide, or other non condensable gases, the reboiled absorber tower and the facilities that make the pure wash methane are not required.

DESCRIPTION OF THE INVENTION AND PREFERRED EMBODIMENT

Figure 1:
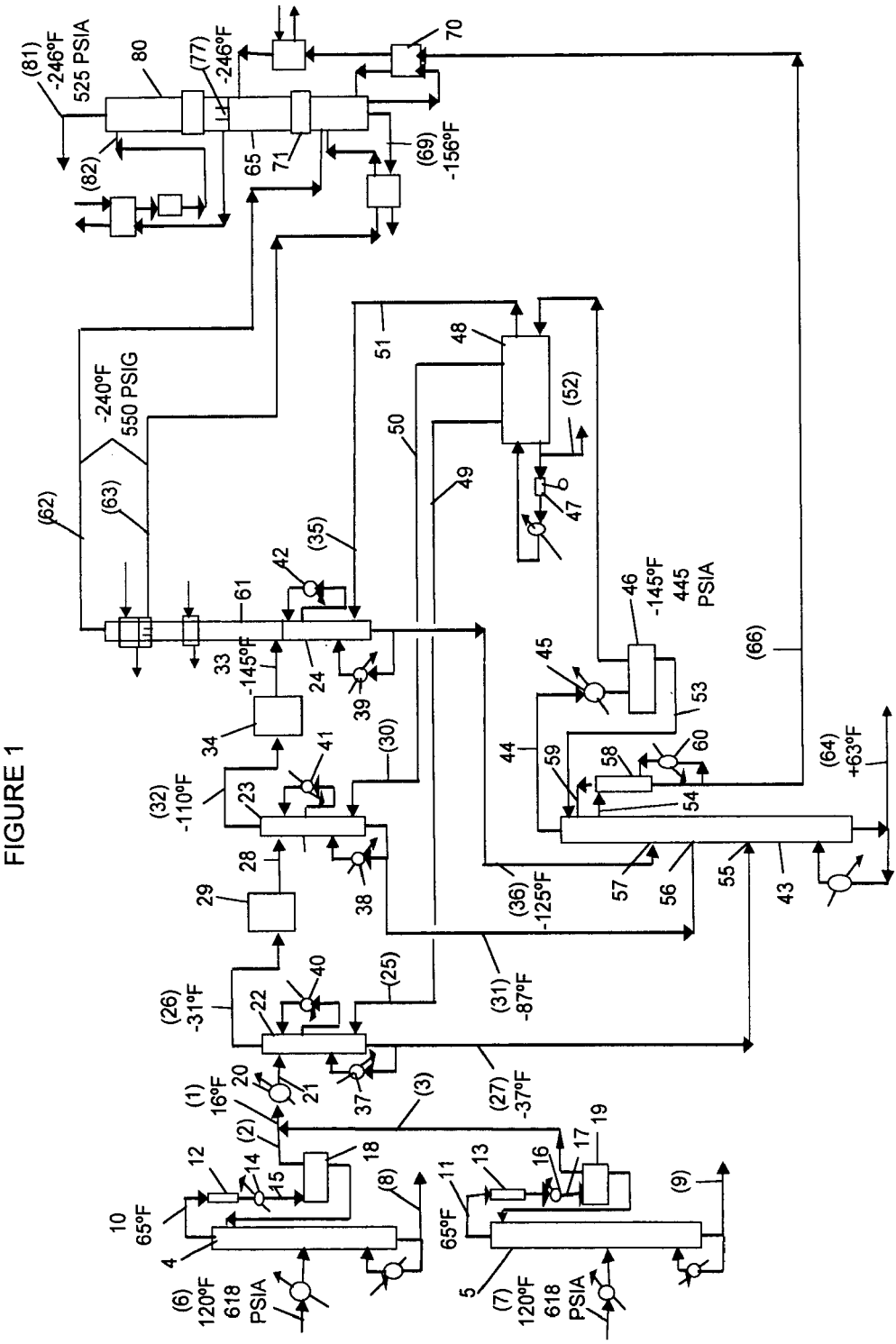
FIG. 1 is a simplified flow plan of a preferred embodiment of the process of the present invention. Pressures, temperatures and flow rates at key points are marked on the drawing. The numbers in parentheses correspond to the material balance for the process of FIG. 1 presented in Table 1.

FIG. 1 is a simplified flow plan of the process of the present invention in a preferred embodiment. Table 1 presents temperatures, flow rates, pressures, and compositions for key process streams that are indicated in FIG. 1.

FIG. 1 does not show auxiliary equipment necessary to operate the process of this invention but that is not critical to describing the invention, such as pumps, valves, and some heat exchangers; these equipment items are well understood by process engineers to be required.

The feed to the process of this invention is a hydrogen bearing stream 1 that contains propane and lighter hydrocarbons. The feed to the process also contains non condensable gases—including nitrogen and carbon monoxide. Non condensable gases complicate recovery of hydrogen.

The feed stream for the process of the present invention 1 is derived from the overheads 2,3 of prefractionator distillation columns 4,5 commonly used in petroleum refineries. The feeds 6,7 to the prefractionators contain butane and higher hydrocarbons, propane, propylene, ethane, ethylene butane, hydrogen, nitrogen and carbon monoxide.

Some of the hydrogen bearing streams produced in refineries contain both saturated and unsaturated hydrocarbons—butenes, propylene and ethylene; other hydrogen bearing light ends streams contain no unsaturated hydrocarbons. Operations that generate hydrogen bearing light ends streams with unsaturates include fluid catalytic cracking, coking, steam cracking, thermal cracking, and dehydrogenation. Operations that generate hydrogen bearing light ends streams that are free of unsaturated hydrocarbons include hydrocracking, deslfurization, catalytic reforming, olefin saturation, isomerization, hydrodealkylation.

It is not cost effective to prefractionate streams containing unsaturates together with streams that do not contain unsaturates. Accordingly, as shown in FIG. 1, hydrogen bearing light ends streams containing unsaturated hydrocarbons are combined and sent to a prefractionator distillation tower 4, dedicated for streams containing unsaturates; hydrogen bearing light ends streams that are free of unsaturated hydrocarbons are combined and sent to another prefractionator 5 that is dedicated to streams that do not contain unsaturates.

Upstream of the prefractionators 4,5 the hydrogen bearing light ends vapor streams are typically cooled with cooling water to condense and recover some of the heavier hydrocarbons. The gas streams are then compressed to about 200 psig and cooled again with cooling water to condense and recover more hydrocarbons. The 200 psig streams are typically washed with an amine solution followed by a caustic and water wash to reduce hydrogen sulfide and carbon dioxide down to trace levels. The washed gas stream is further compressed to about 600 psig, cooled again against cooling water to condense and recover more hydrocarbons and then fed into the saturated or unsaturated prefractionator 4,5. These cooling and compression operations condense and separate most of the C4+ hydrocarbons out of the feed streams.

The prefractionator feeds 6,7 contain water. Some of the water condenses on trays in the prefractionator towers and is removed via side streams extracted from the tower, not shown on FIG. 1.

The prefractionators drive essentially all the hydrogen and methane in the light ends feeds into the prefractionator overhead streams 10,11. The prefractionator bottoms streams 8,9 contain most of the C4 and heavier hydrocarbons in the feed streams and some C2's and C3's. The prefractionator bottoms streams 8,9 are sent on to other fractionation towers on the site, not shown on FIG. 1, to separate and recover the hydrocarbons.

The overhead vapor overhead streams 10,11 from the two prefractionators are dried in desiccant driers 12,13 and then cooled to about 16° F. in prefractionator overhead condensers 14,16 to partially condense the overhead streams. The partially condensed overhead streams 15,16 drop into prefractionator separator drums 18,19. The liquid bottoms streams from the prefractionator separator drums 18,19 are fed back to the top of their respective prefractionator 4,5 as reflux to the prefractionators.

The temperature of the prefractionator overhead streams 10,11 are controlled to maintain the overhead temperature close to but above the hydrate formation temperature of the vapor stream, which is about 65° F.

The vapor overhead streams 2,3 from the prefractionator separator drums 18,19 are combined into the stream 1 that is the feed stream to the process of the present invention. The feed stream 1 contains propane and lighter hydrocarbons, hydrogen, and non-condensable gases—nitrogen and carbon monoxide.

The feed stream 1 is cooled to about −35° F. in a series of heat exchangers 20, which partially condenses the stream 1. The partially condensed feed stream 21 is conveyed to the top of the first of three stripping towers in series that operate at decreasing cryogenic temperatures 22,23,24. More stripping towers can be used to reduce refrigeration energy consumption but at the higher capital cost.

In the first stripping tower 22 the liquid in feed stream 21 drops down the tower trays and is counter currently contacted with a methane gas stream 25 fed into the bottom of the stripper 22 that rises up the tower. The rising methane vapor stream strips almost all the hydrogen and non condensable gases that came in with the feed stream out of the liquid portion of stream 21 up into the first stripper overhead stream 26 and leaves methane and higher hydrocarbons in the bottoms liquid stream.

The overhead vapor stream from the first stripper is chilled and partially condensed 28 in a heat exchanger 29 at about −110° F. and fed into the top of the second stripper 23 where the stripping process with methane vapor 30 is repeated at lower temperatures to remove more of the hydrocarbons into the second stripper bottoms stream 31. The overhead gas 32 from the second stripper 23 is chilled and partially condensed 33 in a heat exchanger 34 to about −145° F. and fed into the top of the third stripper 24 where the stripping process is repeated with methane 35 at still colder temperatures to remove still more hydrocarbons into the third stripper bottoms stream 36.

As shown in FIG. 1 the stripping towers each have a bottoms reboiler 37,38,39 and a side stream reboiler 40,41, 42. These reboilers are optional: they reduce the stream rate of methane vapor stripping gas required to drive most of the hydrogen, nitrogen and carbon monoxide out of the bottoms streams and up into the stripper overhead gas streams.

The methane vapor stripping gas streams 25, 30, 35 that are fed into the bottom of the three strippers 22, 23, 24 come from the overhead gas stream 44 of the demethanizer tower 43. The overhead vapor stream from the demethanizer 44 is partially condensed by cooling it in a condenser 45 to about −145° F. and drops into the demethanizer overhead separator drum 46. The liquid bottoms stream 53 from the demethanizer overhead separator drum 46 is fed back to the top of the demethanizer as reflux. The overhead gas stream from the top of the demethanizer overhead separator drum 46 is compressed to about 600 psig with a compressor 47 and cooled to about −120° F. in a heat exchanger 48. A vapor stream 49 is extracted from the demethanizer overhead heat exchanger 48 at a point in the heat exchanger where the temperature of the demethanizer overhead stream is close to the temperature in the bottom of the first stripper and is fed into the bottom of the first stripper 22 as the stripping gas 25 for the first stripper; likewise, a second vapor stream 50 is extracted from the heat exchanger 48 at a point where the vapor temperature is about the same as the temperature in the bottom of the second stripper 23 bottoms and is fed into the bottom of the second stripper 23 as the stripping gas 30 for the second stripper; and a third vapor stream 51 is extracted from the heat exchanger 48 at a point where the temperature of the vapor is about the same as in the third stripper 24 and is fed into the bottom of the third stripper 33 as the stripping gas 35.

The liquid methane bottoms streams 27, 31, 36 from the strippers 22,23,24 contain the hydrocarbons that came in with the feed stream 1. The stripper bottoms 27,31,36 are conveyed into the demethanizer 43. The ethylene and heavier hydrocarbons that came into the process in the feed leave the process in the liquid bottoms stream 64 from the demethanizer. The demethanizer bottoms stream 64 is sent on to other distillation towers on the site, not shown in FIG. 1, that recover and separate the hydrocarbons. The liquid bottoms streams from the three strippers 22,23,24 are fed into the side of the demethanizer 43 at appropriate points 55, 56, 57. The liquid bottoms stream 27 from the first stripper contains methane plus some of the hydrocarbons that came in with the feed stream 21. The stripper bottoms streams 27, 31, 36 are fed into the demethanizer 43 at points where the ratio of ethylene and ethane to methane in the demethanizer is close to the ratio in the respective stripper bottoms streams 27, 31, 36. This requires that the bottoms stream from the first stripper be fed into the demethanizer at a lower point 55 on the demethanizer 43, the bottoms stream 36 from the third stripper 24 into an upper point 57, and the bottoms stream 31 from the second stripper 23 to a mid point 56. This arrangement reduces energy consumed by the demethanizer.

A pure methane liquid stream is required for the reboiled absorber to absorb the condensable gas out of the hydrogen stream. This stream is produced in the demethanizer 43. In the process of FIG. 1, a very pure liquid methane wash stream is produced for the reboiled absorber using a side stream stripper 58 that receives a liquid methane side stream extracted from near the top of the demethanizer 43 and that is fed into the top of the side stream stripper 58. The overhead vapor stream 59 from the side stream stripper 58 is fed back into the demethanizer 43 at a point above the side stream extraction point. The side stream stripper 58 has a reboiler 60.

Alternatively, the liquid methane stream for the reboiled absorber can be a methane liquid stream extracted from near the top of the demethanizer, or demethanizer reflux condensed in the demethanizer overhead condenser. However, the purity of these methane streams is lower than the purity of the side stream stripper bottoms stream, and accordingly the purity of the hydrogen product stream produced will be lower.

In order to condense sufficient methane in the demethanizer overhead to meet process purification and refrigeration duties and to make the high purity methane liquid stream for the reboiled absorber, the amount of non condensable gases that leaks into the demethanizer in the bottoms streams 27,31,35 from the three strippers 22,23,24 must be limited. Non-condensable gases in the stripper bottoms are reduced by increasing the flow rates of the stripping gas streams 25,30,35 to the three strippers 22,23 24 and/or by adding heat to the strippers with side stream heat exchangers 37,38,39,40,41,42.

A reasonable operating target is to maintain non-condensable gas concentration in the demethanizer overhead stream to below a total of about 6 mole %. In the process of FIG. 1 about one half of the nitrogen and carbon monoxide in the condensed liquid in the feed streams 21,28,33 to the strippers 22,23,24 is stripped out of the liquid into the strippers overhead streams so that about one half of the methane in the feed streams to the demethanizer 43 may be recovered as liquid methane in the demethanizer tower.

The vapor overhead stream from the third (downstream) stripper 24 is fed into the bottom of the rectifier tower 61. The rectifier overhead stream contains the hydrogen recovered from the feed stream 1. The rectifier tower washes the last traces of ethylene, ethane, and higher hydrocarbons out of the rectifier overhead streams 62,63. A rectifier tower is used rather than a fourth stripper because the temperatures at this point are so cold that methane would condense in a fourth stripper.

In FIG. 1 the rectifier is shown in a cost effective configuration: It is mounted directly on top of the third stripper so that the stripper overhead gas stream flows directly into the bottom of the rectifier. Overhead condensers are installed directly into the overhead space of the rectifier that cools the overhead stream first to −200° F. and then to −240° F., partially condensing the rectifier vapor stream 62.

Liquid condensed out of the rectifier overhead at −200° F. drops back into the rectifier as reflux. Some of the −240° F. liquid 63 is also refluxed back into the rectifier 61 as required for the demethanizer to produce methane wash liquid required downstream.

The −240° F. overhead vapor and liquid streams from the rectifier 61 contain the hydrogen recovered from the feed and the nitrogen and carbon monoxide that came in with the feed. The streams 62,63 are fed into the bottom of the reboiled absorber 65. In the reboiled absorber 65 the hydrogen stream rises and the nitrogen and carbon monoxide are washed out of the hydrogen stream by counter current contact with the very pure liquid methane stream 66 from the demethanizer side stream stripper 58 that is fed into the top of the reboiled absorber 65.

The bottoms stream 69 from the reboiled absorber 65 contains essentially all of the nitrogen and carbon monoxide that came into the process with the feed 1. The reboiled absorber bottoms stream 69, that contains the non condensable gases that came in with the feed to the process, is discarded into the fuel gas system after being used as a refrigerant in appropriate heat exchangers.

The reboiler 70 of the reboiled absorber 65 provides stripping vapor that strips hydrogen from the bottoms of the reboiler absorber thereby increasing hydrogen recovery by 5 to 7%.

The stream flow rate of liquid methane 66 to the reboiled absorber 65 required to absorb the nitrogen and carbon dioxide out of the hydrogen stream in the reboiled absorber 65 is reduced by lowering temperatures in the reboiled absorber 65.

Accordingly, as shown in FIG. 1, an intercooler 71 is usually installed in the reboiled absorber 65 to remove heat of absorption released there.

The vapor overhead stream from the reboiled absorber tower 65 contains about 90 mole % hydrogen with methane the major impurity. This is comparable to the purity of on purpose hydrogen produced by steam reforming hydrocarbons so that if 90 mole % hydrogen is acceptable the reboiled absorber overhead stream can be the product stream of this process However, to produce higher purity hydrogen—98 mole % or higher hydrogen—methane is absorbed out of the reboiled absorber overhead vapor stream 77 in the methane absorber 80 by counter currently contacting the reboiled absorber overhead stream 77 that rises up the methane absorber 80 with a liquid lean oil fluid 82 that is fed into the top of the absorber 80 that flows down the tower.

In FIG. 1 the methane absorber 80 is shown in a cost effective configuration, mounted directly on top of the reboiled absorber 65 so that the overhead vapor stream from the reboiled absorber 65 flows directly up into the bottom of the methane absorber 80.

Any hydrocarbon liquid that doesn't freeze at the −250° F. operating temperatures in the methane absorber is suitable as the lean oil for the methane absorber. The lean absorption oil stream is cooled to about −250° F. in heat exchangers and then fed into the top of the absorber. Lowering temperatures in the absorber decreases lean oil rate required. An inter cooler is usually installed in the methane absorber to remove heat of absorption released in the tower.

In the process of FIG. 1 ethane is the lean oil. Ethane is a particularly good lean oil choice if the rich oil ethane bottoms stream from the methane absorber is to be sent on to a steam cracker to make ethylene.

The overhead vapor stream from the methane absorber 80 is the product hydrogen stream. The product hydrogen purity indicated in Table 1 is 98 mole %. Higher purity can be achieved. Hydrogen product purity 81 can be increased by lowering temperatures in the reboiled absorber 65 and increasing methane wash fluid flow 66 to the reboiled absorber 65. For the example of Table 1 About 97% of the hydrogen that came in with the feed streams is recovered in the product stream 81.

If 90 mole % hydrogen product purity will suffice, the hydrogen product stream can be the overhead gas stream from the reboiled absorber 68 and the methane absorber 70 and its lean oil system are not required.

If the feed streams to the process of this invention do not contain non condensable gases—nitrogen and carbon monoxide—then the reboiled absorber 65, the methane wash stream 66, and the demethanizer side stream stripper 58 are not required.

Application of the process of this invention requires extensive cryogenic refrigeration systems and includes heat exchange integration and interchange between process streams and refrigerant streams to reduce refrigeration energy consumption. These design techniques are well understood by process engineers and are not discussed herein.

TABLE 1

PREFRACTIONATOR FEED:

| | SATURATED STREAMS | | | UNSATURATED STREAMS | | | |
|---|---|---|---|---|---|---|---|
| | (7) | (3) | (9) | (6) | (2) | (8) | (1) |
| COMP: | PREFRAC FEED M/Hr | PREFRAC VAPOR OHD M/Hr | PREFRAC BOTTOMS LIQ M/Hr | PREFRAC FEED M/Hr | PREFRAC VAPOR OHD M/Hr | PREFRAC BTMS LIQ M/Hr | COMBINED PREFRAC VAPOR M/Hr |
| H2O | 9 | | | 72 | | | |
| H2 | 309 | 309 | | 1193 | 1193 | | 1502 |
| N2 | 19 | 19 | | 387 | 387 | | 406 |
| CO | 16 | 16 | | 71 | 71 | | 87 |
| C1 | 669 | 667 | 2 | 3007 | 3002 | 5 | 3669 |
| C2= | | | 0 | 1147 | 966 | 181 | 966 |
| C2 | 279 | 214 | 65 | 1063 | 816 | 247 | 1030 |
| C3= | | | 0 | 1693 | 732 | 961 | 732 |
| C3 | 104 | 34 | 70 | 519 | 170 | 349 | 204 |
| C4+ | 52 | 1 | 51 | 1550 | 4 | 1546 | 4 |
| TOTAL | 1457 | | | 10702 | | | |
| HYDROCARBON | 1448 | 1260 | 188 | 10630 | 7341 | 3289 | 8600 |
| TEMP. °F. | 120 | 16 | 207 | 120 | 16 | 207 | 16 |
| PRESS. PSIA | 612 | 600 | 606 | 612 | 600 | 606 | 600 |

ITEM:

| | REC. TW. | | DEMETHANIZER | | | | | REBOILER ABSORBER | | METHANE ABSORBER | | |
|---|---|---|---|---|---|---|---|---|---|---|---|---|
| | (62) | (63) | (25, 30, 35) | (52) | (66) | (64) | (77) | (69) | (82) | (81) | (83) | |
| | OVER HEAD | BTMS. | OHD V | OHD V | OHD V | S STR | BTMS | OHD | BTMS | LEAN | OHD. | BTMS |
| COMP: | VAP. M/Hr | LIQ. M/Hr | LIQ. M/Hr | TO STRIP M/Hr | TO FUEL M/Hr | LIQUID M/Hr | LIQUID M/Hr | VAPORS M/Hr | LIQUID M/Hr | OIL M/Hr | VAPORS M/Hr | LIQUID M/Hr |
| H2O | | | | | | | | | | | | |
| H2 | 1501 | 1 | 9 | | | | | 1465 | 37 | | 1458 | 7 |
| N2 | 320 | 81 | 26 | 154 | 3 | 2 | | 24 | 379 | | 22 | 2 |
| CO | 66 | 16 | 1 | 48 | 1 | 4 | | 2 | 84 | | 2 | 0 |
| C1 | 135 | 719 | 2323 | 2498 | 39 | 2772 | 4 | 135 | 3491 | | | 135 |
| C2= | | | 435 | | 0 | 22 | 944 | 0 | 22 | | 3 | 3 |
| C2 | | | 297 | | | | 1030 | | | 495 | | 495 |
| C3= | | | | | | | 732 | | | | 2 | 2 |

TABLE 1-continued

| | | | | | | | | | | | | |
|---|---|---|---|---|---|---|---|---|---|---|---|---|
| C3 | | | | | | | 204 | | | | | |
| C4+ | | | | | | | 4 | | | | | |
| TOTAL | 2022 | 817 | 3091 | 2700 | 43 | 2800 | 2918 | 1626 | 4013 | 500 | 1482 | 644 |
| TEMP. °F. | −246 | −246 | | −145 | −145 | −138 | 63 | −246 | −156 | | −246 | −222 |
| PRES. PSIA | 525 | 525 | | 445 | 445 | 447 | 452 | 527 | 529 | | 525 | 527 |
| % OF TOTAL OHD VAP: | | | | 98.4 | 1.6 | | | | | | | |

| | ITEM: | | | | | | | | |
|---|---|---|---|---|---|---|---|---|---|
| | 1ST STRIPPER | | | 2ND STRIPPER | | | 3RD STRIPPER | | |
| | STREAM NUMBER: | | | | | | | | |
| | (25) | (26) | (27) | (30) | (32) | (31) | (35) | | (36) |
| | STREAMS: | | | | | | | | |
| COMP: | STRIPPING VAPOR M/Hr | OHD VAPOR M/Hr | BTMS LIQ. M/Hr | STRIPPING VAPOR M/Hr | OHD. VAPOR M/Hr | BTMS. LIQUID M/Hr | STRIPPING VAPOR M/Hr | REC. TW. LIQ M/Hr | OHD. VAPOR M/HR | BTMS. LIQ. M/Hr |
| H2O | | 1502 | 0 | | 1502 | 0 | | 9 | 1511 | 0 |
| H2 | | | | | | | | | | |
| N2 | 40 | 436 | 10 | 34 | 426 | 44 | 80 | 26 | 427 | 105 |
| CO | 12 | 93 | 6 | 11 | 90 | 14 | 25 | 1 | 83 | 33 |
| C1 | 648 | 3764 | 553 | 555 | 2933 | 1386 | 1295 | 2323 | 3177 | 3374 |
| C2= | 0 | 735 | 231 | 0 | 220 | 515 | 0 | 435 | 435 | 220 |
| C2 | | 667 | 363 | | 125 | 542 | | 297 | 297 | 125 |
| C3= | | 235 | 497 | | 10 | 225 | | | | 10 |
| C3 | | 58 | 146 | | 2 | 56 | | | | 2 |
| C4+ | | | 4 | | | | | | | |
| TOTAL | 700 | 7490 | 1810 | 600 | 5308 | 2782 | 1400 | 3091 | 5930 | 3869 |
| TEMP. °F. | −21 | −31 | −37 | −75 | −110 | −87 | −120 | −157 | −142 | −125 |
| PRESS. PSIA | 600 | 569 | 572 | 597 | 560 | 595 | 580 | 560 | 561 | 563 |
| % OF DEC1 VAP | 25.6 | | | 21.8 | | | 51.0 | | | |

What is claimed is:

1. A process for recovering hydrogen from a feed stream that is comprised of hydrogen, a non condensable gas, and hydrocarbons including a hydrocarbon component selected from the group consisting of: propane, propylene, ethane, and ethylene, wherein the process comprises the steps of:
   a. stripping most of the hydrogen and non-condensable gas out of the feed stream with methane vapor to form a stripper overhead vapor stream that includes most of the hydrogen from the feed stream and excludes most of the hydrocarbons in the feed stream;
   b. absorbing most of the non-condensable gas out of the stripper overhead vapor stream with liquid methane to form an absorber overhead vapor stream that contains methane, most of the hydrogen from the stripper overhead stream, and excludes most of the non-condensable gas;
   c. absorbing methane out of the absorber overhead vapor stream with a liquid lean oil to produce a product vapor stream comprising hydrogen.

2. The process of claim 1 wherein the lean oil in step c is a liquid hydrocarbon.

3. The process of claim 2 wherein the lean oil is liquid ethane.

4. The process of claim 1 wherein the non-condensable gas is comprised of a component selected from the group consisting of carbon monoxide and nitrogen.

5. The process of claim 1 wherein the stripping of step (a) is accomplished in a train of strippers connected in series so that the feed stream flows serially through the strippers from the upstream stripper downstream through the strippers, and the temperatures in the strippers decrease from stripper to stripper moving downstream.

6. A process for recovering hydrogen from a stream that is comprised of hydrogen, and a hydrocarbon component selected from the group consisting of: propane, propylene, ethane, and ethylene, wherein the process comprises the steps of:
   a. stripping most of the hydrogen and non-condensable gas out of the feed stream with methane vapor to form a stripper overhead vapor stream that includes most of the hydrogen from the feed stream and excludes most of the hydrocarbon in the feed stream;
   b. absorbing methane out of the stripper overhead vapor stream with a liquid lean oil to produce a product vapor stream comprising hydrogen.

7. A process for recovering hydrogen from a stream that is comprised of hydrogen, non condensable gas, and a hydrocarbon selected from the group consisting of propane, propylene, ethane, and ethylene, wherein the process comprises the steps of:
   a. stripping most of the hydrogen and non condensable gas out of the feed stream with methane vapor to form a stripper overhead vapor stream that includes most of the hydrogen from the feed stream and excludes most of the hydrocarbon in the feed stream;
   b. absorbing most of the non condensable gas out of the stripper overhead vapor stream with liquid methane to form an absorber overhead vapor stream that contains most of the hydrogen from the stripper overhead stream and excludes most of the non condensable gas that is the product stream.

8. A process for recovering hydrogen from a feed stream that is comprised of hydrogen, non-condensable gas, and a hydrocarbon selected from the group consisting of propane, propylene, ethane, and ethylene, and wherein the process includes conveying the feed stream through three or more strippers connected in series so that the feed stream flows downstream first through the upstream stripper and last through the downstream stripper, and wherein temperatures in the strippers decrease from stripper to stripper moving down stream, a demethanizer, a rectifier, a reboiled absorber, and a methane absorber, wherein the process comprises the steps of:

a) conveying the feed stream into the top of the first (upstream) stripper where the feed stream drops down the first stripper to counter currently contact a methane vapor stream that is fed into the bottom of the upstream stripper to produce (1) an upstream stripper overhead vapor stream that contains most of the hydrogen, and most of the non condensable gas from the feed stream, plus methane and some of the hydrocarbon from the feed stream, and (2) an upstream stripper bottoms liquid stream that is comprised of methane and some hydrocarbon from the feed stream;

b) cooling the upstream stripper overhead stream and feeding it into the top of the second (next downstream) stripper where it is counter currently contacted with a methane vapor stream that is fed into the bottom of the second stripper to produce a second stripper overhead vapor stream that contains most of the hydrogen and non condensable gas from the feed stream plus methane and less of the hydrocarbon from the feed stream than is in the overhead stream from the first stripper, and a second stripper bottoms stream that is comprised of methane and some of the hydrocarbon from the feed stream;

c) cooling the second stripper overhead stream and feeding it into the top of the third next downstream stripper where it is counter currently contacted with a methane vapor stream that is fed into the bottom of the third stripper to produce a third stripper overhead steam that contains most of the hydrogen and non condensable gas from the feed stream in methane and less of the hydrocarbons from the feed stream than are in the overhead stream from the second stripper;

d) continuing the sequence of step c for additional downstream strippers;

e) conveying the liquid bottoms streams from each of the strippers into the demethanizer;

f) partially condensing the demethanizer overhead, to form a liquid demethanizer overhead stream and a vapor demethanizer overhead stream, separating the liquid and vapor demethanizer overhead streams, and feeding the demethanizer liquid overhead stream into the top of the demethanizer as reflux;

g) cooling the vapor demethanizer overhead stream in a demethanizer overhead vapor heat exchanger, and extracting some of the cooled demethanizer overhead vapor stream from the demethanizer overhead vapor heat exchanger at point where the temperature of the demethanizer overhead vapor is about the same temperature as the temperature In the bottom of the first stripper and feeding that extracted gas stream into the bottom of the first stripper as the stripping gas for the first stripper, and extracting a second gas stream from the demethanizer overhead vapor heat exchanger at a point where the temperature of the demethanizer overhead gas stream is at a temperature close to the temperature in the bottom of the second stripper and conveying the gas stream leaving the demethanizer overhead heat exchanger to the bottom of the third stripper as the stripping gas for the third stripper and continuing this sequence for additional downstream strippers;

h) extracting a liquid stream from the demethanizer and feeding the extracted liquid stream into the top of a reboiled demethanizer side stream stripper, extracting a liquid stream from the bottom of the reboiled demethanizer side stream stripper, and conveying the extracted liquid stream from the bottom of the reboiled demethanizer side stream stripper into the reboiled absorber near its top;

i) conveying the vapor overhead gas stream from the last most downstream stripper into the bottom of the rectifier tower to form a rectifier liquid bottoms stream and a rectifier vapor stream that rises up the rectifier tower;

j) cooling the rectifier vapor stream to partially condense the rectifier vapor stream to form a liquid rectifier overhead stream and a vapor rectifier overhead stream;

k) conveying the liquid rectifier bottoms stream into the top of the last most downstream stripper;

l) feeding part of the liquid rectifier overhead stream back into the top of the rectifier and the remainder of the liquid rectifier overhead stream into the reboiled absorber near the bottom of the reboiled absorber, and feeding all of the vapor rectifier overhead vapor stream into the reboiled absorber near its bottom, and forming a reboiled absorber vapor stream that rises up the reboiled absorber;

m) in the reboiled absorber counter currently contacting the rising reboiled absorber vapor stream with the liquid stream from the bottom of the demethanizer side stream stripper to produce a reboiled absorber liquid bottoms stream that contains most of the non condensable gas that came in with the feed stream to the process and an overhead reboiled absorber gas stream that contains most of the hydrogen that came in with the feed stream to the process;

n) conveying the overhead gas stream from the reboiled absorber to the bottom of the methane absorber where the reboiled absorber overhead gas stream rises and is counter currently contacted with a stream of liquid lean oil that is fed into the top of the methane absorber that absorbs methane out of the reboiled absorber overhead stream to produce a methane absorber overhead gas stream that contains most of the hydrogen that came into the process in the feed stream that is the product stream of this process, and a methane absorber rich oil bottoms stream that contains the methane absorbed out of the reboiled absorber overhead gas stream.

9. The process of claim 8 wherein the non-condensable gas in the feed is comprised of a component selected from the group consisting of nitrogen and carbon monoxide.

10. The process of claim 8 wherein the bottoms streams from the first (upstream) stripper is fed into the demethanizer at an appropriate point in the demethanizer where the ratio of ethylene and ethane approximates the ratio of ethylene and ethane in the first stripper bottoms stream, and the bottoms stream from the second stripper is fed into the demethanizer at a point where the ratio of ethylene and ethane in the second bottoms stream approximates the ratio in the demethanizer, this point being above the point where the first stripper bottoms stream was fed into the demethanizer, and conveying the stripper bottoms stream from the third stripper into the demethanizer at a point in the demethanizer where the ratio of ethylene and ethane to methane in the third stripper bottoms stream approximates the ratio in the demethanizer, this point being above the point where the bottoms from the second stripper is conveyed into the demethanizer, and continuing this sequence for each stripper.

11. The process of claim 8 wherein the strippers are equipped with side stream reboilers.

12. The process of claim 8 wherein the strippers are equipped with bottoms reboilers.

13. The process of claim 8 wherein the lean oil fed to the top of the methane absorber is a hydrocarbon.

14. The process of claim 8 wherein the lean oil fed to the top of the methane absorber in step 1 is ethane.

15. The process of claim 8 wherein two or more strippers are used.

16. The process of claim 8 wherein the reboiled demethanizer side stream stripper and extracted demethanizer side stream are deleted and condensate from the demethanizer overhead is conveyed to the top of the reboiled absorber.

17. A process for recovering hydrogen from a feed stream that is comprised of hydrogen, non condensable gas, and a hydrocarbon selected from the group consisting of propane, propylene, ethane, and ethylene and wherein the process includes two or more strippers connected so that the feed stream flows through the strippers in series, and temperatures in the strippers decrease from stripper to stripper moving downstream, a demethanizer, a rectifier, and a reboiled absorber, wherein the process comprises the steps of:

a. conveying the process feed stream into the top of the first (upstream) stripper where the feed stream drops down the first stripper to counter currently contact a methane vapor stream that is fed into the bottom of the first stripper to produce a first stripper overhead stream that comprises essentially all of the hydrogen, non condensable gas from the feed stream plus methane and some of the hydrocarbons from the feed stream and a first stripper bottoms liquid stream that is comprised of methane and some of the hydrocarbons from the feed stream;

b. cooling the first stripper overhead stream and feeding it into the top of the second stripper where it is counter currently contacted with a methane vapor stream that is fed into the bottom of the second stripper to produce a second stripper overhead stream that comprises essentially all of the non condensable gas from the feed stream plus methane and less of the hydrocarbon from the feed stream than is in the overhead stream from the first stripper, and a first stripper bottoms stream that is comprised of methane and some of the hydrocarbon from the feed stream;

c. and repeating the stripping operation as in steps a and b for the additional strippers downstream of the second stripper through to the last (most downstream) stripper;

d. conveying the liquid bottoms streams from the strippers into the demethanizer;

e. partially condensing the demethanizer overhead, separating the liquid and vapor demethanizer overhead, and feeding the demethanizer overhead liquid phase into the top of the demethanizer as reflux, and cooling the demethanizer gas phase in a demethanizer overhead heat exchanger, and extracting some of the cooled demethanizer overhead gas stream from the demethanizer ovehead heat exchanger at point where the temperature of the demethanizer overhead gas is about the same temperature as temperature In the first stripper and feeding that extracted gas stream into the bottom of the first stripper as the stripping gas for the first stripper, and extracting a second gas stream from the demethanizer overhead exchanger at a point where the temperature of the demethanizer overhead gas stream is at a temperature close to the temperature in the bottom of the second stripper and conveying this gas stream to the bottom of the second stripper, and repeating this for the subsequent downstream strippers;

f. extracting a liquid stream from the demethanizer into top of a reboiled demethanizer side stream stripper and feeding a liquid bottoms stream from the reboiled demethanizer side stream stripper to the reboiled absorber;

g. conveying the vapor overhead gas stream from the last (downstream) stripper into the bottom of the rectifier tower where it rises up the rectifier tower into a heat exchanger that cools the vapor stream to partially condense the rectifier vapor stream to form a liquid stream part of which is refluxed back into the top of the rectifier, and a vapor stream that contains essentially all the hydrogen and non-condensable gas from the feed stream and that contains essentially none of the ethylene and heavier hydrocarbons that came in with the feed stream, and the rectifier tower also produces a liquid rectifier bottoms stream that is conveyed into the top of the downstream stripper;

h. conveying the rectifier overhead streams to the bottom of the reboiled aborber wherein the overhead from the rectifier tower rises up the reboiled absorber and is counter currently contacted with the methane wash stream from the demethanizer to produce a reboiled absorber liquid bottoms stream that contains most of the non-condensable gas that came in with the feed stream to the process and an overhead reboiled absorber gas stream that contains most of the hydrogen that came in with the feed stream and that is the hydrogen product stream from this process.

18. The process of claim 17 wherein the bottoms streams from the first (upstream) stripper is fed into the demethanizer at an appropriate point in the demethanizer where the ratio of ethylene and ethane approximates the ratio of ethylene and ethane in the first stripper bottoms stream, and the bottoms stream from the second (next down stream) stripper is fed into the demethanizer at a point where the ratio of ethylene and ethane in the second bottoms stream approximates the ratio in the demethanizer, this point being above the point where the first stripper bottoms stream was fed into the demethanizer, and conveying the stripper bottoms stream from subsequent downstream strippers into the demethanizer at points in the demethanizer where the ratio of ethylene and ethane to methane in the stripper bottoms stream approximates the ratio in the demethanizer, and these points are above points where the stripper bottoms from adjacent upstream strippers are fed into the demethanizer.

19. The process of claim 17 wherein the demethanizer side stream stripper is deleted and the extracted side stream is conveyed into the reboiled absorber.

* * * * *